United States Patent [19]

Engdahl et al.

[11] Patent Number: 5,471,461
[45] Date of Patent: Nov. 28, 1995

[54] DIGITAL COMMUNICATION NETWORK WITH A MODERATOR STATION ELECTION PROCESS

[75] Inventors: Jonathan R. Engdahl; Mark A. Lucak, both of Saline; David J. Gee, Ann Arbor; Paul Kucharski, Saline, all of Mich.

[73] Assignee: Allen-Bradley Company, Inc., Milwaukee, Wis.

[21] Appl. No.: 54,581

[22] Filed: Apr. 28, 1993

[51] Int. Cl.$^6$ .................................................. H04L 12/24
[52] U.S. Cl. ........................... 370/17; 370/85.6; 370/94.1
[58] Field of Search ..................... 370/17, 85.1, 79, 370/85.2, 85.6, 91, 92, 94.1, 119; 375/121; 340/825.06, 825.07, 825.22, 825.31; 371/69.1; 395/325

[56] References Cited

U.S. PATENT DOCUMENTS

| | | | |
|---|---|---|---|
| 4,017,841 | 4/1977 | Jensen | 364/200 |
| 4,229,792 | 10/1980 | Jensen et al. | 364/200 |
| 4,319,338 | 3/1982 | Grudowski et al. | 364/900 |
| 4,404,651 | 9/1983 | Grudowski | 364/900 |
| 4,413,319 | 11/1983 | Schultz et al. | 364/200 |
| 4,628,504 | 12/1986 | Brown | 370/85.7 |
| 4,663,704 | 5/1987 | Jones et al. | 364/188 |
| 4,667,323 | 5/1987 | Engdahl et al. | 370/85.4 |
| 4,709,376 | 11/1987 | Kage | 371/69.1 |
| 4,718,061 | 1/1988 | Turner | 370/85.6 |
| 4,747,100 | 5/1988 | Roach et al. | 370/85.4 |
| 4,750,150 | 6/1988 | Weppler | 364/900 |
| 4,780,869 | 10/1988 | Engdahl et al. | 370/16 |
| 4,809,217 | 2/1989 | Floro et al. | 364/900 |
| 4,897,834 | 1/1990 | Peterson et al. | 370/85.1 |
| 4,918,652 | 4/1990 | Bennington et al. | 364/900 |
| 4,972,183 | 11/1990 | Kuhlmann et al. | 370/17 |
| 5,077,733 | 12/1991 | Whipple | 370/85.6 |
| 5,142,623 | 8/1992 | Staab et al. | 395/200 |
| 5,153,884 | 10/1992 | Lucak et al. | 371/32 |
| 5,237,695 | 8/1993 | Skokan et al. | 370/85.6 |

FOREIGN PATENT DOCUMENTS 0132069  1/1985  European Pat. Off. .

*Primary Examiner*—Benedict V. Safourek
*Attorney, Agent, or Firm*—John J. Horn; H. F. Hamann

[57] ABSTRACT

A moderator on a communication network periodically transmits a set of parameters for a protocol that is used to communicate over the network. Each node on the network compares the set of protocol parameters from the moderator to a set of parameters stored in that node. If the sets of parameters at a given node do not match, that given node ceases transmitting messages over the network until either the set of protocol parameters from the moderator match the stored set of parameters, or a matching set of parameters is stored in the node. Typically the active node that is assigned the lowest numerical network address functions as the moderator. However, an automatic process is utilized to prevent a node with a non-matching set of the protocol parameters from becoming the moderator for more than a brief period of time. An override procedure is provided to force all the nodes on the network to adopt a common set of protocol parameters in the event that the automatic process fails.

15 Claims, 7 Drawing Sheets

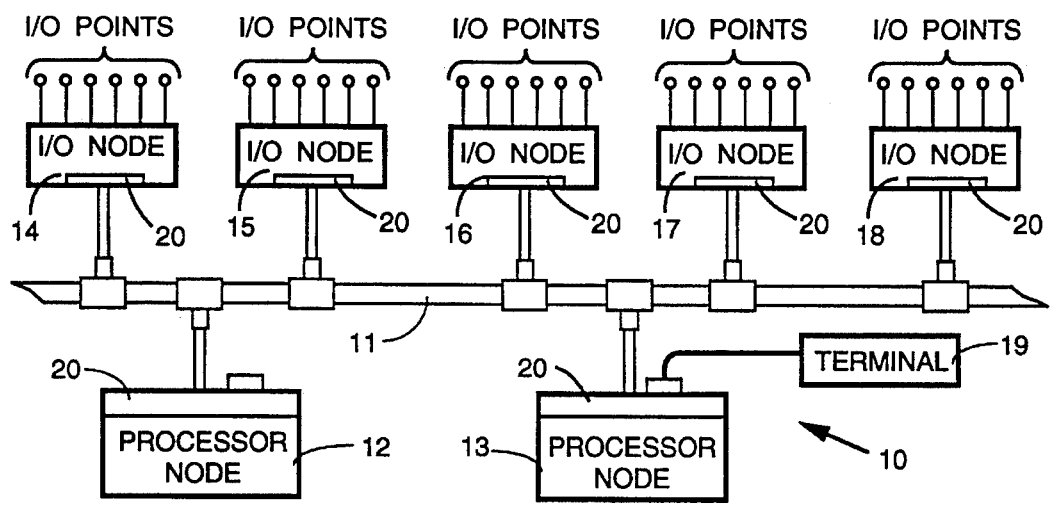
FIG. 1
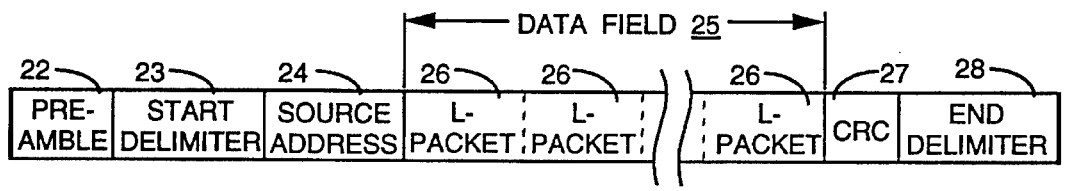
FIG. 2A   MAC FRAME 21
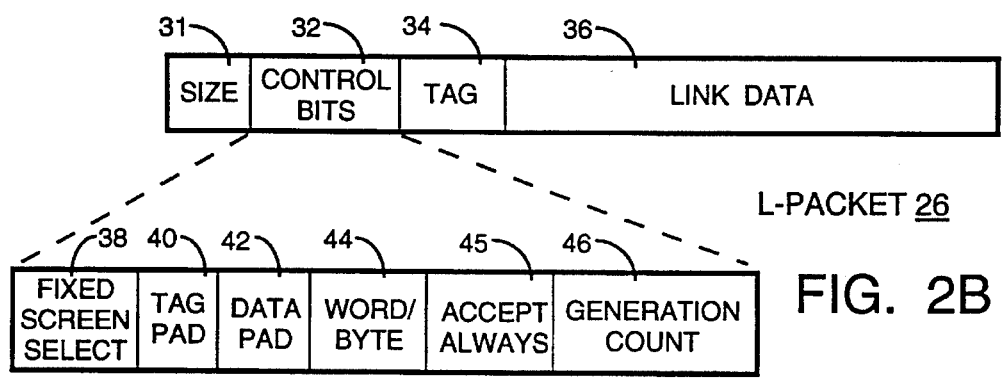
FIG. 2B
L-PACKET 26
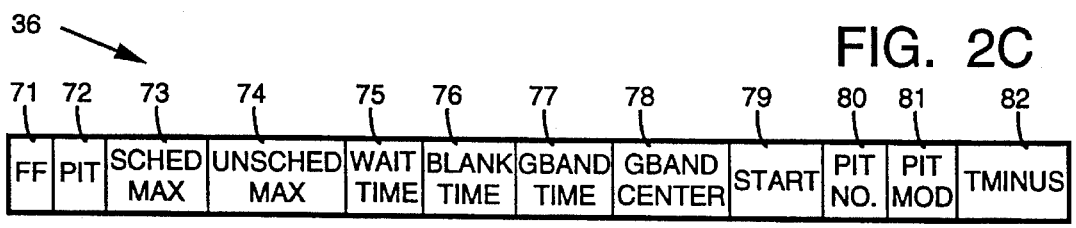
FIG. 2C

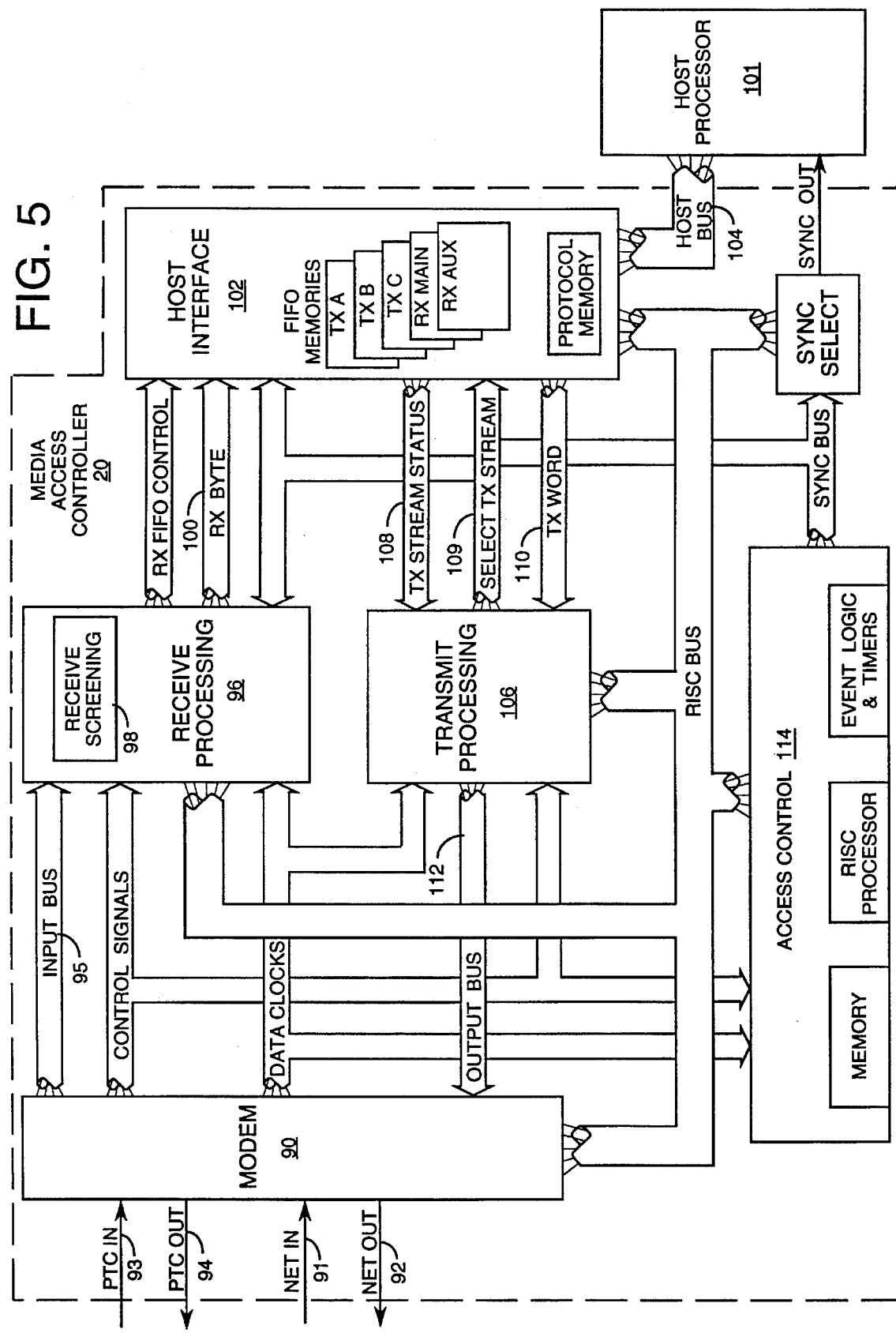

DIGITAL COMMUNICATION NETWORK WITH A MODERATOR STATION ELECTION PROCESS

BACKGROUND OF THE INVENTION

The field of the invention is communication networks, and particularly, to industrial communication networks that are employed to exchange data among control systems for factory machinery.

Factories are automated by controllers that are programmed, or configured, to operate specific machines or devices. Such controllers may be general purpose, such as computers, numerical controls or programmable controllers; or they may be special purpose controllers, such as robot controllers, weld controllers or motor drives.

Each controller connects to the various sensing devices and operating devices on the machinery which it controls and it automates the operation of that machinery by inputting data from the sensing devices and outputting the appropriate data to the operating devices. This exchange of input and output ("I/O") data between the controller and the devices on the controlled machinery is often accomplished by direct connections between ports on the controller and each separate I/O device. However, when I/O devices are physically spread out over a large area, the wiring costs associated with such separate connections can become excessive.

One way to reduce wiring in such applications is to multiplex I/O data through a serial communications link. Such serial I/O links are commonly used to connect the centrally located controller to separate remote racks, or chassis, that are positioned adjacent to the I/O devices. Such "remote I/O systems" are disclosed, for example, in U.S. Pat. Nos. 4,404,651; 4,413,319; 4,809,217 and 4,750,150, where the controller carries out a continuous high speed scan of the I/O data associated with each remote rack and that data is conveyed through the serial communications link. It can be appreciated that such serial I/O links must promptly and reliably convey the I/O data, since that data is directly controlling operating devices on a machine that is operating in real time.

While a single controller may automate a machine, or a small group of machines, such "islands of automation" must be connected together to truly automate an entire factory. These latter connections are provided by industrial local area networks that enable each controller to send messages to other similar controllers in the factory over serial data links. There are a large number of such "peer-to-peer" communications networks known in the art, some of which are developed by standards committees like IEEE 802.3, IEEE 802.4, IEEE 802.5 and MAP; and others are developed by manufacturers of the controller like those disclosed in U.S. Pat. Nos. 4,319,338; 4,667,323 and 4,747,100. It can be appreciated that the nature of the peer-to-peer data conveyed on local area networks connecting controllers is different than I/O data conveyed on serial I/O links. While some of the data may indicate the state of the machinery being controlled, much of the traffic is large blocks of data. For example, a "cell controller" may download control programs for programmable logic controllers or part programs for numerical controls, and programmable logic controllers may up-load blocks of statistical data concerning production and quality control. While I/O data is usually time critical and must be conveyed reliably within milliseconds of the event which generated it, the up loading and down loading of large blocks of data usually is not as time critical.

While remote I/O serial communications networks and peer-to-peer networks have coexisted in factories for many years, a number of factors are blurring the distinction between them and dictating that a single network having the attributes of both be created. One of these factors is technical—the increasing use of smaller controllers in so-called "distributed processing." For example, rather than a single large controller linked to a set of remote I/O racks, an alternative architecture is a set of linked small controllers positioned about the factory in place of each remote I/O rack. The resulting communications link that connects these small, distributed controllers must convey both time critical I/O data as well as peer-to-peer messages. Another factor is the desire of factory owners to reduce the number of different communications networks used, in order to simplify employee training and maintenance, and to reduce the inventory of spare parts.

The medium employed to convey the data on a serial communications link is dictated primarily by cost and the rate at which data must be conveyed. The lowest cost medium used in factory installations is twisted wire pairs which has a small bandwidth, and the most expensive medium is fiber optic cable which provides enormous bandwidth. The most common medium employed on the factory floor, however, is shielded cable, such as coaxial cable, which provides a good cost/performance compromise.

The chosen medium can interconnect the controllers and remote racks in different patterns, commonly referred to as "network topology". While so-called "star" and "ring" topologies can be found in the factory, the "bus" topology is by far the most prevalent. With the bus topology, a cable extends around the factory floor from one station to the next, and a short drop line is tapped into this bus and connected to the controller at that station. The bus topology is the most cost effective and easy to install.

Access to the communications network is determined by the "media access control" (MAC) protocol employed on the network. In early local area networks, and in many remote I/O networks, a single "master" station controlled access to the medium. For example, in the remote I/O network described in the above-cited patents, the programmable controller serves as the master of the network and signals the remote I/O racks when they can have access to the medium. This single-master protocol is satisfactory for remote I/O networks where loss of the programmable controller master results in a shut down of the entire network, but it is unsatisfactory in a peer-to-peer communications network. In a peer-to-peer network, communications should continue between the controllers on the network even if one controller is disconnected or malfunctions. Indeed, the fact that a controller is no longer operating may itself need to be communicated throughout the network to other controllers in the factory so that they can take appropriate action.

There are a number of media access control protocols commonly used in factories which do not rely on a single master. These include physical ring token passing networks such as that defined in the IEEE 802.5 standard, the logical ring token passing networks such as that defined in the IEEE 802.4 standard, and the carrier sense multiple access with collision detection (CSMA/CD) networks such as that defined in the IEEE 802.3 standard. While these protocols are appropriate for peer-to-peer communications where a message, or block of data, is sent with each access to the media, they are not appropriate for conveying large amounts of real-time I/O data.

Another media access control protocol which may be employed in factory applications is referred to as a dynamic time slot allocation (DTSA) network or dynamic time division multiple access (DTDMA) network. A DTDMA network suitable for conveying real time I/O data is disclosed, for example, in U.S. Pat. No. 4,897,834 and a time division multiplexing (TDM) network suitable for conveying both real time I/O data and message data is disclosed in U.S. Pat. No. 4,663,704.

Even though a network does not have a master station, it may have a moderator station that contains a reference set of values for the parameters of the communication protocol. Such parameters may define how long any single station can have access to the network and the number of station addresses being used. Should it become necessary to change the parameters, for example when a number of new stations are added to the network, the reference set of values is changed and then communicated over the network to all of the stations.

Should the moderator fail, a process must exist for selecting a successor. Another problem arises when a new station on the network erroneously believes that it is the moderator station. In that case the moderator pretender assumes control of the network and can introduce a bogus set of protocol parameters that degrade the network performance and even can prevent some stations from sending messages. A mechanism is required to prevent this from occurring.

SUMMARY OF THE INVENTION

A communication network has a plurality of nodes connected to a transmission medium, such as a coaxial cable, with each node being assigned a unique numerical network address. One of the nodes is designated as a moderator and as such periodically transmits a control message that contains a set of communication protocol parameter values over the medium. Typically the node that is assigned the lowest numerical network address acts as a moderator.

A general object of the present invention is to provide a unique process to prevent a node that possesses a non-conforming set of protocol parameters from acting as the moderator and from disturbing an existing moderator. In order to select a node to act as the moderator, each node receives all the messages sent by other nodes over the medium and determines from those messages whether another node is assigned a network address with a lower numerical value than the network address assigned to that node. The determination process occurs for a sufficiently long period of time that all active nodes will have an opportunity to have sent a message over the network. At the end of that period, one node on the network will have not found another node with a lower numerical network address. That one node begins functioning as the moderator, and continues to do so as long as no other active node has a lower numerical network address than the given node.

Another object of the present invention is to provide a technique by which a node that has a different set of protocol parameters, than those being sent by the moderator, is disabled from transmitting over the network. To this end, each node, upon receiving a control message from the moderator, compares the set of protocol parameters in the control message to a set of protocol parameters stored in a memory at the node. If the two sets of parameters are not the same the node ceases transmitting over the network and is merely able to receive messages. A node remains in this receive-only state until either the set of protocol parameters from the moderator matches its stored parameters, or a set of matching protocol parameters is stored into the memory of the node.

Yet another object is to provide a manual override procedure in the event a node with a non-conforming set of parameters manages to assume functioning as the moderator.

A further object of the present invention is to provide a mechanism by which a user interface terminal can be connected to the network and learn the set of protocol parameters from the message sent by the moderator. In addition, a process is provided by which the terminal is able to learn about an unused network address and assume that unused network address as its own address on order to communicate over the network.

BRIEF DESCRIPTION OF THE DRAWINGS

FIG. 1 is a representation of a communication network incorporating the present invention;

FIGS. 2A, 2B and 2C illustrate the subdivisions of a message frame sent by a node on the communication network;

FIG. 5 is a schematic block diagram of a media access controller at each node on the communication network;

DESCRIPTION OF A PREFERRED EMBODIMENT

Figure 3:
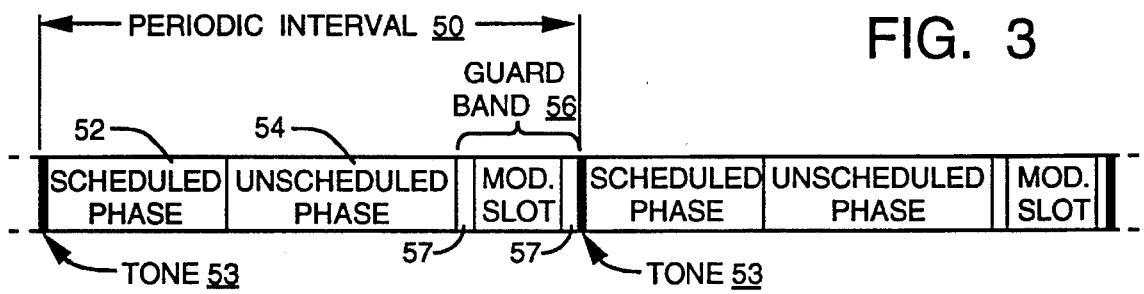
FIG. 3 illustrates the sequence in which messages are exchanged over the communication network.

Initially referring to FIG. 1, an industrial control communication network 10 comprises a medium 11 to which a number of stations, or nodes, 12–18 are connected to send and receive data. The network 10 may employ any suitable medium, such as coaxial or fiber optic cables, and may be based on any suitable topology, for example, bus, star or ring topologies. In the exemplary embodiment described herein, the interconnections of network 10 utilize a coaxial cable 11 connected in a bus topology. Each node is connected to the cable 11 by a media access controller 20.

The nodes on the illustrated network 10 include two processor nodes 12 and 13, such as programmable controllers, cell controllers or minicomputers, and several input/output (I/O) nodes 14–18. It is understood that a greater number of devices may be connected to the network for a total of N nodes where N is an integer. A unique numerical network address is assigned to each node 12–18 and is used to identify each node. A user interface terminal 19 can be connected to the network through the media access controller 20 at any node, however, the terminal assumes its own unique network address, as will be described. The user interface terminal 19 is a personal computer which executes a program that enables an operator to monitor and control the operation of the network 10, as will be described.

The network 10 is referred to herein as a concurrent time division, multiple access (CTDMA) communication network in that both input/output data used by the processors 12 and 13 in operating the machinery, as well as control commands, system management and other messages, are concurrently exchanged over the same medium 11 with each node 12–18 being granted access to transmit messages in a time division multiplexed manner. The CTDMA network 10 utilizes a token bus type protocol in which an "implicit token" is passed from node to node in a prescribed order and the node possessing the implicit token can transmit its messages. However, the implicit token is not physically passed among the nodes, rather each one monitors the network activity and has a register in which it keeps track of the node that it believes currently possesses the token. All the nodes 12–18 must adhere to a well-defined communication protocol to avoid interfering with one another as messages are sent over the cable 11.

Network Communication Protocol

Referring to FIG. 2A, all messages regardless of the type of data being sent are formatted as a media access control (MAC) frame 21 having a maximum length of 517 bytes. Each time a node is granted access to send information over the network, it may send one MAC frame. The MAC frame 21 begins with a preamble 22 and a start delimiter 23. A unique start delimiter 23 is used to establish a precise synchronization point in the incoming data in order for the receiver to accurately detect each data character.

Following the start delimiter 23 in the MAC frame 21 is the network address 24 of the source node which originated the message. The MAC frame 21 also has a data field 25 that is up to 510 bytes long and which is divided into basic messaging units referred to as Lpackets 26, which stands for "link-layer packets". Each Lpacket 26 represents a separate message or group of data and includes a unique identifying tag which each node 20 uses to determine whether it requires the information in that Lpacket. If a given node has several Lpackets to send, the Lpackets are placed in a queue and transmitted in the queued order. If there are more Lpackets 26 in the queue than can fit within one MAC frame, the remaining ones have to wait until the node again is granted access to the network medium 11.

Each Lpacket 26 is subdivided into a series of fields as shown in FIG. 2B. The first field 31 is a byte which indicates the size, or length, of the Lpacket 26. The second field 32 contains eight control bits as indicated in the enlargement of that field in the drawing. The first control bit 38 designates one of two forms of message addressing, fixed or general purpose, used in the tag field 34 of the Lpacket. The fixed form includes a function code followed by a destination address. A fixed mode message is inspected in each node 20 by a circuit referred to as a "fixed screener" to determine whether the node is interested in that Lpacket. As an example, the fixed mode is used to broadcast network management messages to all the nodes or to send network commands to a specific node. In this latter case, the fixed tag for the Lpacket contains the network address of the recipient node. The general purpose form of addressing allows the user to define the meaning of the tag according to a set of rules created for the specific network. For example, a unique tag number may designate a particular type or origin of I/O data that may be of interest to several nodes. A "general purpose screener" in each node inspects this latter form of tag to determine if the Lpacket is of interest to the node, as will be described.

The third and fourth control bits 40 and 42 are designated "tag pad" and "data pad" and indicate the alignment of the tag and data fields 34 and 36 in the Lpacket. The tag and data fields have variable lengths and may or may not begin on a sixteen-bit word boundary in the Lpacket 26. The tag pad and data pad control bits 40 and 42 indicate that alignment and are used by a recipient node in separating the Lpacket fields. The next control bit 44 indicates whether the data contained in the Lpacket is in byte size or sixteen-bit word sized increments. The final section 46 comprises three control bits which provide a generation count. In some implementations of the CTDMA protocol a source node may send multiple copies of the same Lpacket in different MAC frames 21 to insure that at least one of the Lpackets will reach the intended recipients. The generation count remains the same for each duplicate Lpacket and enables a recipient node to ignore the duplicates after one of those Lpackets has been successfully received. When the generation count changes, the network nodes 20 know that the message contents of that tagged Lpacket has changed. When the "accept always" control bit 45 is set, recipient nodes ignore the generation count in determining whether to accept the Lpacket for processing.

Following the control bits 32 in the Lpacket 26 is the tag 34 that has a variable number of bytes. The tag identifies the type of Lpacket enabling a recipient node to ignore, or screen out, the Lpackets that it is not interested in, keeping only those of interest. As will be elaborated upon, "screeners" in each node 20 accept only those Lpackets having selected tags. In order to maintain a boundary between the tag field 34 and the link data field 36 at an even number of words from the beginning of the data field 25 when the Lpacket is stored in a recipient node's memory, the tag field 34 must contain an even number of bytes in the MAC frame as exchanged with host devices 12, 13, 14 15, 16, etc. A tag that is transmitted with an odd number of bytes is indicated by the tag pad control bit 40 which signals circuitry in the sending node to delete a pad byte from the tag field before transmitting the Lpacket, and signals a recipient node to add a pad byte to the tag field before transferring the Lpacket to the host processor 101.

The final field 36 of the Lpacket 26 contains the data or command being exchanged, referred to as "link data". The number of bytes in field 36 varies depending upon the amount of data the source node has to send. Since the data may be in byte or word sized increments, receiver circuits in the recipient nodes must be able to handle either format. As will be described, the receiver circuits are designed to handle word size increments. If the link data 36 has an odd number of bytes, as indicated by the data pad control bit 42, the recipient node must add a pad byte to the data field before storing the Lpacket into memory.

Referring again to FIG. 2A, after the Lpackets in the MAC frame 21 is a conventional cyclic redundancy code (CRC) word 27 that a recipient node uses to detect when the frame is corrupted during transmission. The final section 28 of the MAC frame 21 is an end delimiter by which the nodes can detect when the frame has ended.

A given node 12–18 may transmit a MAC frame 21 over the network 10 only at designated times to prevent interference among the frames from different nodes. The transmission of messages occurs during a series of reoccurring periodic intervals 50 as shown in FIG. 3. The length of the periodic interval is definable by the user as will be described. Each periodic interval 50 is divided into three subdivisions: the scheduled phase 52 for I/O data, the unscheduled phase 54 for other types of messages, and a guard band 56 for message coordination.

Figure 4A:
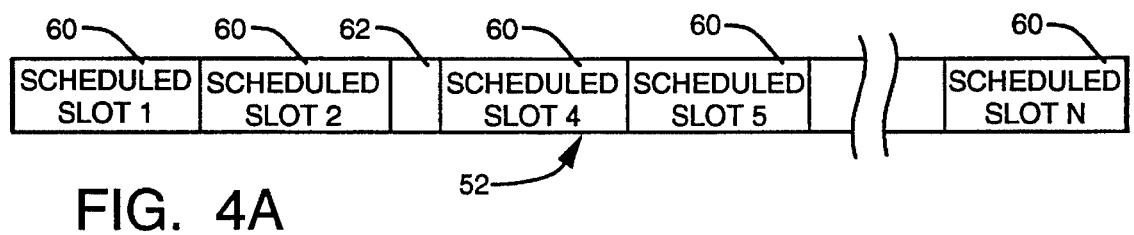
FIG. 4A depicts the order in which different stations on the network send messages during the scheduled phase of each periodic interval.

During the scheduled phase 52, each node 12–18 is afforded an opportunity to transmit that type of data over the network. As depicted in FIG. 4A, the scheduled phase 52 is broken down into time slots 60 for each of P nodes 20, where P is the maximum number of nodes that may ever transmit I/O data. For example, the user interface terminal 19 never transmits I/O data and does not require a slot in the scheduled phase 52. Spare slots usually are provided in the scheduled phase 52 to allow additional nodes to be added at a later time. Each time-slot 60 typically is as long as the time required to send a MAC frame 21 of the maximum length permitted by the network protocol (e.g. 510 bytes). However, a station may have a fixed function and the exact amount of data that it will send is well known. Therefore, the slot allocated to such a station merely has to be long enough to send that known amount of data which usually is less than the maximum amount permitted by the network protocol. This allows significant bandwidth savings and results in faster response times for the data that is present.

A guard band 56 is located at the end of each periodic interval 50. When the guard band terminates, a "tone" signal 53 is generated within each node 12–18 to indicate the temporal boundary between two periodic intervals 50. Although this signal is not sent over the network cable 11, it enables each node to count time in synchronism. The media access controller 20 in each node has a clock which continues to produce the tone signal even if the node fails to receive a synchronizing message during one or more guard bands 56. Upon generating the tone signal, the network node having the first address transmits a MAC frame of I/O data in scheduled slot 1. If that first node does not have any I/O data, it will transmit an empty MAC frame, i.e. one without any Lpackets. On the other hand, if a node has more I/O data than can be transmitted in a single MAC frame 21, the remaining data may be sent during the unscheduled phase 54, if that node has an opportunity to transmit in that phase.

At the end of the scheduled slot 1 for the first node, the node 12–18 with the next sequential network address transmits its I/O data during scheduled slot 2. Note that in this example, either a node has not been assigned address 3 or the assigned node presently is inactive. If an active node was assigned this address and did not have I/O data to transmit, the node would transmit a null MAC frame 21, which does not contain data. Thus scheduled slot 3, otherwise occupied by I/O data from the third node, is replaced by a short "dead" period 62. The fourth network node listens during this dead period for the third node to transmit. The listening, or wait, period must be at least as great as the longest time for a signal to propagate between any two nodes. If a transmission is not heard during the listening period, a "slot time-out" occurs and the fourth node concludes that the third node does not exist and begins transmitting I/O data over the network cable 11.

This sequence continues until all of the P nodes on the network 10, which are configured for scheduled phase transmission, have been given an opportunity to transmit, i.e. until the implied token has been passed once around the network. The actual duration of the scheduled phase 52 varies in relation to how many network nodes 20 have I/O data to send, and the amount of I/O data each node sends. Depending upon these factors, it is conceivable that the entire periodic interval 50 can be consumed with a scheduled phase 52 and a guard band 56. However, as is more often the case, the network will be configured to guarantee that time remains following the scheduled phase 52 for an unscheduled phase 54.

During the so called unscheduled phase 54, at least some of the network nodes 12–18 are afforded an opportunity to send any remaining I/O data as well as other message types, such as ones containing control commands and manufacturing production information. Whatever time remains in the periodic interval 50 after the scheduled phase 52 is devoted to the unscheduled phase 54. Therefore each node is not necessarily guaranteed time during the unscheduled phase 54 in which to send messages, however this is acceptable as the unscheduled phase messages by definition are less time critical than the I/O data.

Figure 4B:
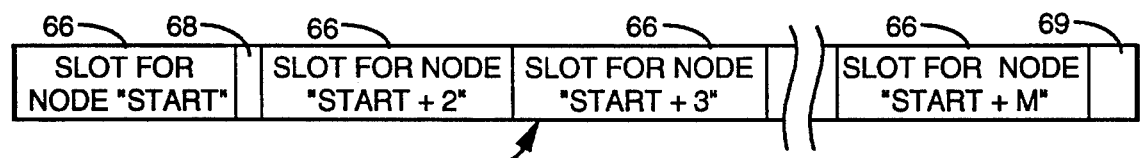
FIG. 4B depicts the order in which different stations on the network send messages during the unscheduled phase of each periodic interval.

If enough time remains, the nodes 12–18 may send MAC frames during the unscheduled phase 54 in a sequence depicted in FIG. 4B. Another distinction between the two phases 52 and 54 is that the node allowed to transmit first during the unscheduled phase changes every periodic interval 50. This first node is indicated by a network address designated by the variable START, which is stored by each node in an internal register of the media access controller 20. At the completion of the unscheduled phase 54, the value of START is incremented so that the node with the next numerical network address will have the first opportunity to send a message frame during the unscheduled phase of the next periodic interval. When the value of START reaches the highest address designated for the unscheduled phase, it is reset to the lowest address. Although the implicit token is passed only once in the scheduled phase 52, it is passed around as many times in the unscheduled phase as time allows.

Thus, at the beginning of the unscheduled phase 54 the node 12–18 having an address equal to START sends a message frame. When a node does not have this type of message to send, an empty message frame, i.e. one without any Lpackets, is sent. Then the node with the next network address (START+1) is permitted to send a message frame, and so on until the time remaining in the unscheduled phase is used up. In the exemplary unscheduled phase 54 depicted in FIG. 4B, a gap 68 exists after the slot 66 for the START node, which indicates that address START+1 either is unassigned or the assigned node is presently inactive, thus creating dead time on the network. As with the scheduled phase 52, if a node fails to start sending a message during its slot, the next node in the address sequence (e.g. START+2) begins transmitting after a listening period.

One should also note that a small amount of time 69 remains after the node designated (START+M) stops transmitting near the end of the unscheduled phase 54. Because this amount of time 69 is too short for another MAC frame 21, a transmission does not occur. For this purpose, each node 12–18 keeps track of the time remaining in the periodic interval. The number of nodes M that are afforded an opportunity to send a MAC frame 21 during a given unscheduled phase 54 depends upon the amount of time remaining in the periodic interval 50 after the scheduled phase 52 and the length of the flames each node has to send.

A period of time, referred to as a guard band 56, is reserved at the end of the periodic interval 50. During the guard band, one of the nodes 12–18, that is designated as the network "moderator," broadcasts a MAC frame 21 having a single Lpacket 26 that contains network protocol parameters. The moderator generally is the active node with the lowest numerical network address, and in addition to functioning as any other node, the moderator transmits the protocol parameters during the moderator slot of each guard band 56. The Lpacket for the moderator message frame has the same format as illustrated in FIG. 2B, with the fixed screen select bit set and a tag indicating a moderator Lpacket. FIG. 2C depicts the link data field 36 of this special Lpacket which contains the protocol information. The first block 71 of data contains the hexadecimal number FF which indicates the broadcast address. The next data block 72 holds the periodic interval time (PIT) in terms of the number of ten microsecond increments, which informs every node of the duration of each periodic interval 50. The third and fourth data blocks 73 and 74 indicate the nodes with the highest network addresses that are permitted access to the network in the scheduled and unscheduled phases, respectively. Typically, a greater number of nodes require network access during the unscheduled phase, as some nodes never have I/O data to transmit. For example, the user interface terminal 19 only will send data over the network cable 11 during the unscheduled phase and should not be assigned a network address that is polled in both phases, as that only slows the scheduled phase. This mechanism also prevents transient nodes, such as the user interface terminal 19, from taking scheduled time away from other nodes that need it.

The fifth block of data 75 in the moderator Lpacket defines the listening time (in microseconds) that a station must wait for the preceding station to transmit before assuming that the other station is not going to do so. For example, the Wait Time is set to an amount at least equal to twice the longest network propagation time plus the response time of a node plus the amount of time required for one node to detect the transmission of another node.

Very often a node will hear an echo of its own transmission. Unless otherwise inhibited, the node may process the receipt of the echoed MAC frame as though it originated from another node. The sixth data block 76 contains a definition of a blank time during which a node is deaf following its transmission so that it can not accept its own messages. The Blank Time also is used to determine an amount of time that a node must delay after transmitting or receiving a message frame before it is able to transmit over the network. Thus a short quiet time exists between message frames.

Referring still to FIG. 2C, the next two Lpacket data blocks 77 and 78 define the length of the guard band 56 and the point within the guard band at which the moderator should begin transmitting the MAC frame. The contents of the guard band time block 77 are used by each node to determine when a guard band 56 is occurring. A timer within the node is loaded with the periodic interval time (PIT) when the tone 53 occurs. This timer is decremented every ten microseconds, and when the time remaining in the periodic interval equals the guard band time from data block 77, the node knows that a guard band is starting. As each node relies on its own internal timer to detect events such as the guard band, if a particular node's timer is fast or slow, the operation of that node will not be synchronized precisely with the other nodes. Therefore the moderator does not commence sending the MAC frame of network control information at the very beginning of the guard band 56. Instead the moderator waits until a later time, designated GBAND CENTER, that is given in data block 78. The internal timer in the moderator node is used to determine when this time occurs. Another field can be provided to identify a point in time during the periodic interval after which point nodes are require to stop transmitting over the network cable 11 to prevent interfering with the moderator.

The next protocol data block 79 of the moderator Lpacket identifies the address of the node 12–18 that will be afforded the first opportunity to transmit during the unscheduled phase of the next periodic interval. Each periodic interval is numbered, and block 80 contains the number, or PIT COUNT, of the current interval. The periodic interval numbering uses modular arithmetic and data block 81 contains the modulus. This number scheme allows certain nodes to be configured to transmit data only during periodic intervals having a given number. For example, a given node may process I/O data that is not so time critical that the data must be sent during every periodic interval. Therefore, the given node may be configured to send data only once every defined number of periodic interval through the use of the periodic interval number.

At various times, it becomes necessary to change the values of the network protocol parameters. For example, if there is not a vacant address below the scheduled or unscheduled maximums in blocks 73 and 74 when a new node is added to the network, the value in one or both of those blocks will have to be increased. This is accomplished by an operator calling up the network configuration software on the user interface terminal 19 and redefining the necessary network protocol parameters. The user interface terminal then sends the new parameter values to each node in separate configuration Lpackets during the unscheduled phase 54 of subsequent periodic intervals. This configuration Lpacket has a fixed tag that identifies that the Lpacket contains values for the protocol parameters. The recipient nodes store the new protocol parameter values in a set of holding registers in the media access controller 20.

In order to ensure that all of the network nodes 20 begin utilizing the new protocol parameter values at the same time, the moderator Lpacket contains a number designated TMINUS in block 82. Under normal circumstances, the TMINUS will have a value of zero. However, when new protocol parameter values have been distributed to the network nodes, the moderator Lpacket will have a non-zero TMINUS value in block 82 (e.g. a value of twenty). As each subsequent moderator Lpacket is sent, each node decrements the value of TMINUS. When the TMINUS reaches zero, all of the nodes transfer the parameter values from the set of holding registers into a set of active registers in the media access controller 20 from which the parameters are read to coordinate activity on the network 11. This process delays the use of the new values for the protocol parameters for several periodic intervals 50, so that all of the nodes will have a very high probability of implementing the change at the same time.

The MAC frame in the guard band 56 also provides synchronization of the docks within each node 20. The end of that MAC frame provides a reference point from which each node times the interval until the tone signal is generated within the node. Thus every time a node satisfactorily receives the moderator message frame, its internal clock is resynchronized with the clocks in all of the other nodes. The accuracy of these clocks is such that a node still can function on the network for several periodic intervals without satisfactorily receiving the moderator message frame before the clock drifts enough to cause errors. Under normal conditions, the node will satisfactorily receive a moderator message frame and become synchronized before excessive drift occurs.

Thus, the present CTDMA network communication protocol allows both input/output data and other message information to be sent over the same network medium in designated portions of the periodic intervals 50. During each periodic interval 50, priority is given to the I/O data which is used to control the machinery operated by the processors 13–15 on the network 10. Once every node 20 on the network has been afforded the opportunity to send its I/O data the remaining portion of the periodic interval is devoted to the transmission of other forms of information during an unscheduled phase. Although each network node 20 is not guaranteed the opportunity to send a message during the unscheduled phase 54, over the course of several periodic intervals each node will receive that opportunity. If such opportunities do not occur frequently enough, the network operator may have to lengthen the periodic interval.

Media Access Controller

The communication protocol is implemented at each node by the media access controller 20, the details of which are shown in FIG. 5. This device has a modem 90 having a pair of input and output lines 91 and 92, respectively, that are connected to a tap on the network cable 11. The modem 90 has another pair of input and output lines 93 and 94 to which the user interface terminal 19 can be connected. The user interface terminal 19 originates messages for transmission over the network or messages destined just for the node to which it is connected. The modem 90 is able to send and receive signals from both the network cable 11 and the user interface terminal 19. The data received via inputs 91 and 93 are applied by the modem 90 to an input bus 95 which is connected to a receive processing circuit 96. The receive processing circuit 96 includes screening devices 98 which inspect the tag 34 of each Lpacket 26 received via the input bus 95 to select only those Lpackets which have tags of interest to the particular node. The receive screening circuit 98 contains a memory table of the tags that are of interest. The Lpackets that are found to be of interest by the receive processing circuit 96 are passed over a receive (RX) byte bus 100 to a host interface circuit 102. The host interface circuit 102 contains a pair of first-in/first-out memories (RX Main and RX Aux) which temporarily hold the received data for transmission via a host bus 104 to the host device at that particular node. The host device may be a programmable controller at nodes 12 or 13, or I/O interface circuitry at nodes 14–18.

Data received via the host bus 104 from the host device is stored by the host interface 102 in one of three first-in/first-out transmit memories (TXA, TXB, TXC). The host interface 102 is connected to transmit processing circuit 106 by a pair of control buses 108 and 109 and a transmit word data bus 110. The presence of data in one of the transmit FIFO memories in the host interface 102 causes appropriate control signals to be sent to the transmit processing circuit 106 via the TX stream status bus 108. When the transmit processing circuit 106 is ready to handle the data, a signal is sent via select TX stream bus 109 causing the appropriate FIFO memory TXA, TXB OR TXC to apply its stored data to the TX word data bus 110. The transmit processing circuit 106 takes the incoming data and formulates it into a MAC frame 21 which then is sent via output bus 112 to the modem 90 for transmission to the network and the user interface terminal via output lines 92 and 94, respectively.

The operation of the modem 90, receive and transmit processing circuits 96 and 106 and the host interface 102 is controlled by an access control circuit 114 which includes a RISC processor. The access control circuit detects the occurrence of the slots in the scheduled phase 52 and the unscheduled phase 54, and when a slot assigned to its node occurs, the access control enables the transmit processing circuit 106. The access control circuit 114 has an internal memory which stores the set of network protocol parameters. The access control circuit 114 utilizes those stored protocol parameters in instructing the receive and transmit processing circuits 96 and 106 as well as the modem 90 how to communicate via the network cable 11. As previously described, the media access controller 20 receives these protocol parameters in a configuration Lpacket with a special fixed tag sent during an unscheduled phase. The receive screening circuit 98 detects the special fixed tag and forwards the Lpacket via the host interface 102 to the host processor 101. Software in the host processor interprets the Lpacket and send a special Lpacket to the SMAC 100 which stores the new protocol parameters.

Another type of network node, referred to as a "plug and play" node upon being connected to the network merely listens to the communication activity to learn the set of network parameters presently being used. It should be noted that a node does not require the protocol parameters to listen on the network, only to send data. To learn the protocol parameters, the media access controller 20 within this type of node listens on the network until it receives the moderator Lpacket during the guard band 56. The access control circuit 114 in this type of node stores the moderate Lpacket protocol parameters for later use in communicating via the network. Upon the receipt of a predefined number of consecutive moderator Lpackets containing identical protocol parameters, the parameters will be accepted by the plug and play network node and used to transmit over the network 10. As will be described, the user interface terminal 19 is a plug and play network node.

Node Operation

Figure 6A:
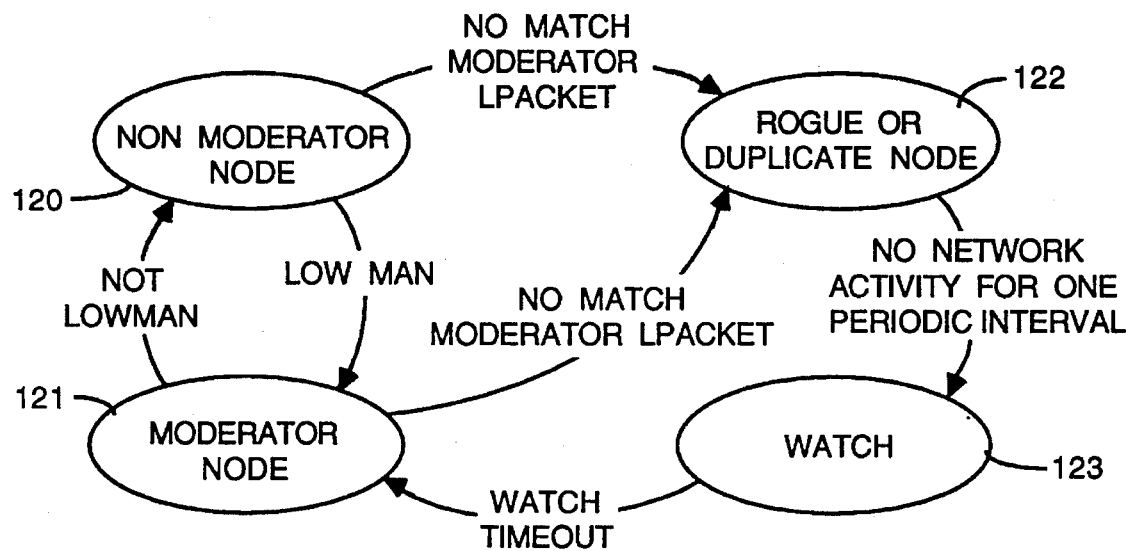
FIGS. 6A and 6B are state diagrams of the operation of a native node and a foreign node respectively.

Regardless of the type of node, the access control circuit 114 of the media access controller 20 for a node operates in one of several states as depicted by the state diagram in FIG. 6A. Once the network 10 has been established, one of the nodes will be operating in the moderator state 121 and all of the other nodes will operate in the non-moderator state 120. In both of these states 120 and 121, the nodes receive MAC frames 21 sent over the cable 11 and separate Lpackets of interest from those frames. In addition, the moderator and non-moderator nodes transmit MAC frames with data from their host device during their assigned periodic interval slot. However, the node in the moderator state 121 also sends a MAC frame with the moderator Lpacket during each guard band 56. Another state 122 is designated for rogue and duplicate nodes. A rogue is a node whose internal stored set of protocol parameters do not match those carried by the moderator Lpacket. A duplicate node is one having the same network address as another node that already is transmitting on the network. In both of these cases, it is undesirable for the rogue or duplicate node to transmit data over the network, thus in state 122 such a node merely listens to the network activity. When a conflict arises, such as when rogue is present on the network, the nodes temporarily enter a watch state 123, as will be described.

Each node performs a power-up process to determine in which state to initially begin operating. This process depends upon the class of the host device for the particular node. The first of the two classes consists of "keeper devices" which maintain configuration information within a nonvolatile memory, for example processor nodes 12 and 13. The second class of host devices, referred to as a "kept device," does not have such a nonvolatile memory and therefore does not maintain configuration information in storage when the power is removed from the device. The I/O nodes 14–18 may fall into this class. A keeper device may maintain a set of configuration information for itself and for other kept devices.

Figure 7:
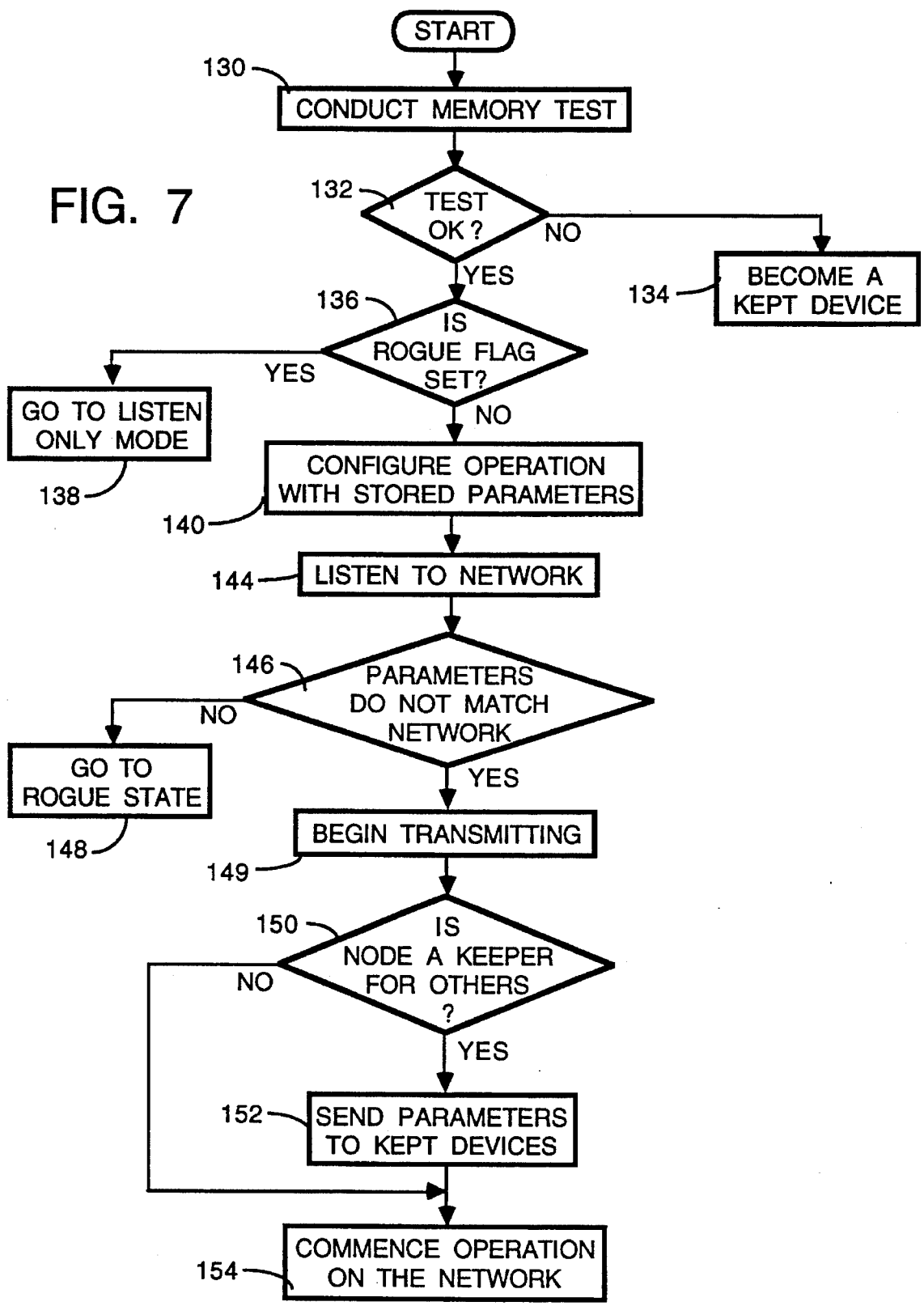
FIG. 7 is a flowchart of the power-up process performed by a device at a node which maintains configuration parameters in a nonvolatile memory.

FIG. 7 illustrates part of a process which a keeper device goes through when it is powered up, i.e. turned on. At step 130, a test of the nonvolatile memory is conducted to determine the integrity of data stored therein. If the test fails at step 132, the program execution branches to step 134 where the device becomes a kept device and begins performing a power-up process for that class of device, as will be described.

Assuming that the memory passes the test, the execution of the power-up program advances to step 136 where a determination is made whether the flag within a nonvolatile memory is set indicating that this particular device is a "rogue." A rogue is a node with a different set of protocol parameters than other nodes on the network 10. That flag will have been set during previous operation of the device when a determination is made that the set of protocol parameters stored in the node do not match the protocol parameters carried by the moderator Lpacket. When the rogue flag is set, the device branches to step 138 where it only listens to the activity on the network cable 11. Assuming that the rogue flag is not set, the information stored within the nonvolatile memory will be utilized to configure the operation of this device's media access controller 20 at step 140.

The node for this host device then begins listening to the activity on the network at step 144. During a guard band 56, the protocol parameters carried over the cable 11 by the moderator Lpacket are compared by the node at step 146 to the set of protocol parameters stored within memory 103 of the media access controller 20. If the two sets of parameters do not match, the access control circuit 114 enters the rogue state 122 at step 148 where it merely listens to the activity on the network and does not transmit information. After seeing mismatched parameters in 32 moderator Lpackets, the rogue flag is set in the nonvolatile memory of the host device. The rogue flag can be cleared, or healed, whenever a large number of moderator Lpackets are received without a mismatch, or upon receiving the proper protocol parameters in a configuration Lpacket. On the other hand, if the parameters match at step 146 the node will join the network and begin transmitting at step 149.

A determination is made at step 150 whether the present device is a keeper of configuration information for other devices. If so, that information is then transmitted to the kept devices at step 152 during one or more unscheduled phases 54, before the present device commences operation at step 154.

Figure 8:
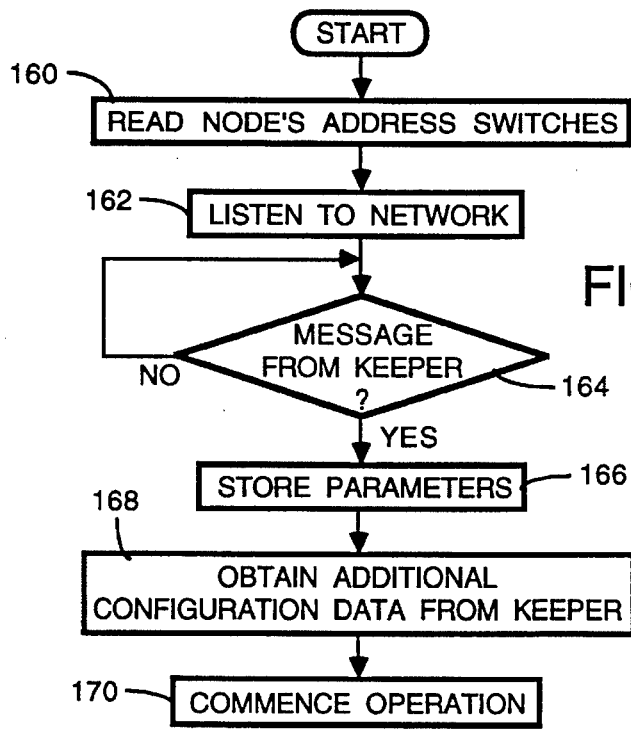
FIG. 8 is a flowchart of the power-up process performed by a device at a node which does not maintain configuration parameters in a nonvolatile memory.

If the host device being powered up is a kept device, a power-up process depicted in FIG. 8 is performed. The power-up commences at step 160 where the network address is read by the access control circuit. The media access controller 20 then begins listening to the network at step 162. The kept node begins waiting at step 164 until it receives a message from its keeper node during an unscheduled phase 54 which message contains the protocol parameters for the node of the kept host device. When this message is received, the process advances to step 166 where the access control circuit 114 stores the protocol parameters contained in the message. If necessary, those parameters then are used to request additional configuration information from the keeper device at step 168. Once the kept device has received all of the necessary configuration data, it joins the network and commences operation at step 170.

Network Operation

The first node that completes the power-up process will enter the moderator state, however this node may not remain as the moderator. As other nodes join the network 10, an automatic mechanism determines which node should continue to function as the moderator. Furthermore, should an existing moderator fail, this mechanism enables the node with the next lowest address to assume moderator functions automatically. Alternatively, the mechanism could selected the node with the highest network address to serve as the moderator.

Under normal circumstances, the first node to become active following its power-up process assumes the role of moderator and begins sending the moderator Lpacket during each guard band 56. As other nodes become active, each one listens to each MAC frame 21 sent over cable 11 for the source address 24 of the node originating that network message. The media access controller in each node keeps track of the source addresses to determine the lowest network address being used by an active node. Alternatively, the node's media access controller 20 detects which slots 60 and 66 of the periodic interval 50 contain a MAC frame and from that detection a determination can be made of the lowest network address in active use. In order for this process to succeed, a node that does not have any data to send still transmits a null MAC frame 21, one without any data, so that its address will be communicated to the other active nodes. When a new node joining the network has an address greater than the presently acting moderator, the node makes a transition to the non-moderator state 120. Otherwise when the new node has a lower network address than the presently acting moderator, the new node is the low man and takes over as the moderator. In that case, the previous moderator makes a transition to the non-moderator node state 120. Ultimately after all the nodes have powered-up and joined the network, one node will function continuously as the moderator. The nodes continue to monitor which node is the low man, so that should the moderator fail, the node with the next lowest address will enter the moderator state 120.

After the network operation has been established, a "foreign" node which previously was not part of the network may become attached to it, such as when a new programmable controller is added to the network. If the foreign node possesses the same set of operating parameters as the "native" nodes on the network, a conflict in communication will not exist. However, if the foreign node has network parameters that are different from those carried by the moderator Lpacket, the foreigner is a rogue node. A rogue not only is unable to properly communicate over the network, it may corrupt regular communication if it is the low man. The rogue's set of protocol parameters may not allow proper data communication among the native devices, as is the case where the maximum number of nodes defined in the parameters for the scheduled and unscheduled phases is less than the actual number of native nodes. Therefore, a technique must be provided to prevent a rogue node from acting as the moderator and seizing control of the network.

Assume that the network 10 is operating fully after power-up and a foreign node with a different set of network communication parameters stored in its memory 103 is to be added to the network. Just prior to connecting the network cable 11 to the foreign node, all of the existing native nodes are in either the moderator state 120 or the non-moderator state 121 and the foreign node not hearing activity at its network port oscillates between the moderator and the watch states 121 and 123. Upon connection to the network, the foreign node may be in either the watch state 123 or the moderator state 121. Once connected, if the node is in the watch state, it will hear the existing native node moderator, enter the rogue state 122, and remain in a listen-only mode until new communication parameters are supplied to it. If the foreign node is in the moderator state 121, (1) it may or may not be the low man and (2) it may send a moderator Lpacket first or hear the existing moderator's Lpacket. If the network address of the foreign node is higher that the address of the existing moderator, all the native nodes will ignore any moderator Lpacket sent by the foreign node. Regardless of whether the foreign node is the low man, as soon as it hears the existing moderator's Lpacket, the foreign node enters the rogue state due to a parameter mismatch and ceases transmitting. However, if the foreign node transmits a moderator Lpacket first, the network will enter a rogue recover sequence.

Figure 6B:
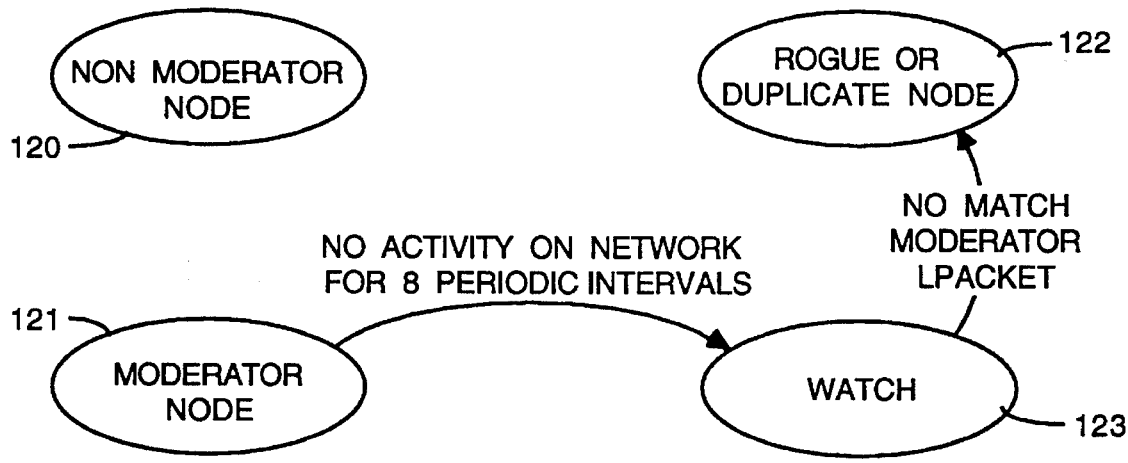

FIGS. 6A and 6B depict the rogue recover sequence occurs when a foreign node has the lowest network address of all the active nodes and is connected to the network at the beginning of a periodic interval. The foreign node will be the first node to transmit during the scheduled phase 52, thus identifying itself as having the lowest address. The previous moderator will recognize that it no longer is the low man and enter the non-moderator state 120. The foreign node will assume the role of the moderator and transmit a moderator Lpacket during the next guard band 56. When the native nodes hear the foreigner's moderator Lpacket with protocol parameters that do not match their internally stored parameters, the media access controllers 20 within the native nodes enter the rogue state 122, as a result, all of the native nodes initially believe that they are a rogue. In the rogue state 122 the access control circuit 114 disables the transmit processing circuit 106 from sending messages onto the network cable 11, thus all the native nodes may only listen to the network activity. Therefore, the only node transmitting over the network cable 11 at this time is the foreign node. In the rogue state 122, the access circuit 114 keeps track of whether stations are sending MAC frames during each periodic interval.

The media access controller 20 in the foreign node recognizes that for eight periodic intervals it has been the only node transmitting on the network and enters the watch state 123 as shown in FIG. 6B. In the watch state, the access control circuit 114 disables the transmit processing circuit 106 from sending messages onto the network cable 11 while enabling the receive processing circuit 96 to listen to the network activity. Upon entering the watch state 123, the access control circuit 114 activates a timer to a value which corresponds to the duration of six maximum length periodic intervals 50. Since all of the network nodes are in the watch or the rogue states where none is allowed to transmit, the network cable 11 becomes silent. The native nodes in the rogue state 122 recognize the absence of activity on the network for an entire periodic interval and respond by transferring into the watch state 123. This transition causes each node's access control circuit 114 to set a timer to an interval that is equivalent to the duration of three maximum length periodic intervals.

When a watch state timer elapses, the respective access control circuit 114 makes a transition to the moderator node state 121, whether the node is a native node or a foreign node. However, since the watch state timers in the native nodes were loaded with a shorter interval, those timers will time-out before the watch state timer of the foreign node. Therefore, the media access controllers 20 in the native nodes make transitions from the watch state 123 to the moderator node state 121 before the foreign node has that opportunity. Thus, the native nodes become active on the network before the foreign node and all the native nodes enter the moderator state at about the same time. At the appropriate slot of the schedule phase 52 during the next periodic interval 50, each native node configured for I/O data transmits a MAC frame 21. Based on which slots contain a MAC frame 21, each node can determine whether it is the low man. The low man native node will remain in the moderator state 121, while the other native nodes make a transition to the non-moderator node state 120 as shown in FIG. 6A.

During the guard band 56 of this periodic interval 50, the native node that remains in the moderator node state 121 transmits a moderator Lpacket containing the network protocol parameters stored in its memory. Since the foreign node still is in the watch state 123, it is listening to the activity on the network. Therefore, when the foreign node receives this moderator Lpacket, it will realize that the network parameters in that Lpacket do not match those stored in its memory. This causes the foreign node to make a transition into the rogue state 122. After a predefined number of valid moderator Lpackets have been received by the foreign node, the media access controller 20 in that node sets a flag which indicates that it is a rogue node. This flag is stored within a nonvolatile memory of the host device so that it will not be affected by loss of power or removal of the node from the network.

This process insures that a native moderator is considered to be the low man on the network even though the rogue node has a lower numerical network address. Therefore, a rogue node having the lowest network address is prevented from seizing control of the network to the detriment of the majority of nodes which have the correct set of communication parameters.

Under certain circumstances, the automatic mechanism for detecting a rogue node and rendering that rogue inoperative may fail. For example, if two identically configured foreign nodes are connected to the network at about the same time, they may begin talking to one another. In this situation, the rogue node has another node on the network with which it is able to communicate and there will never be a periodic interval during which there is no activity on the network. In the absence of such a quiet periodic interval, the automatic rogue disabling process will fail since the rogue node never will enter the watch state 123.

Figure 10:
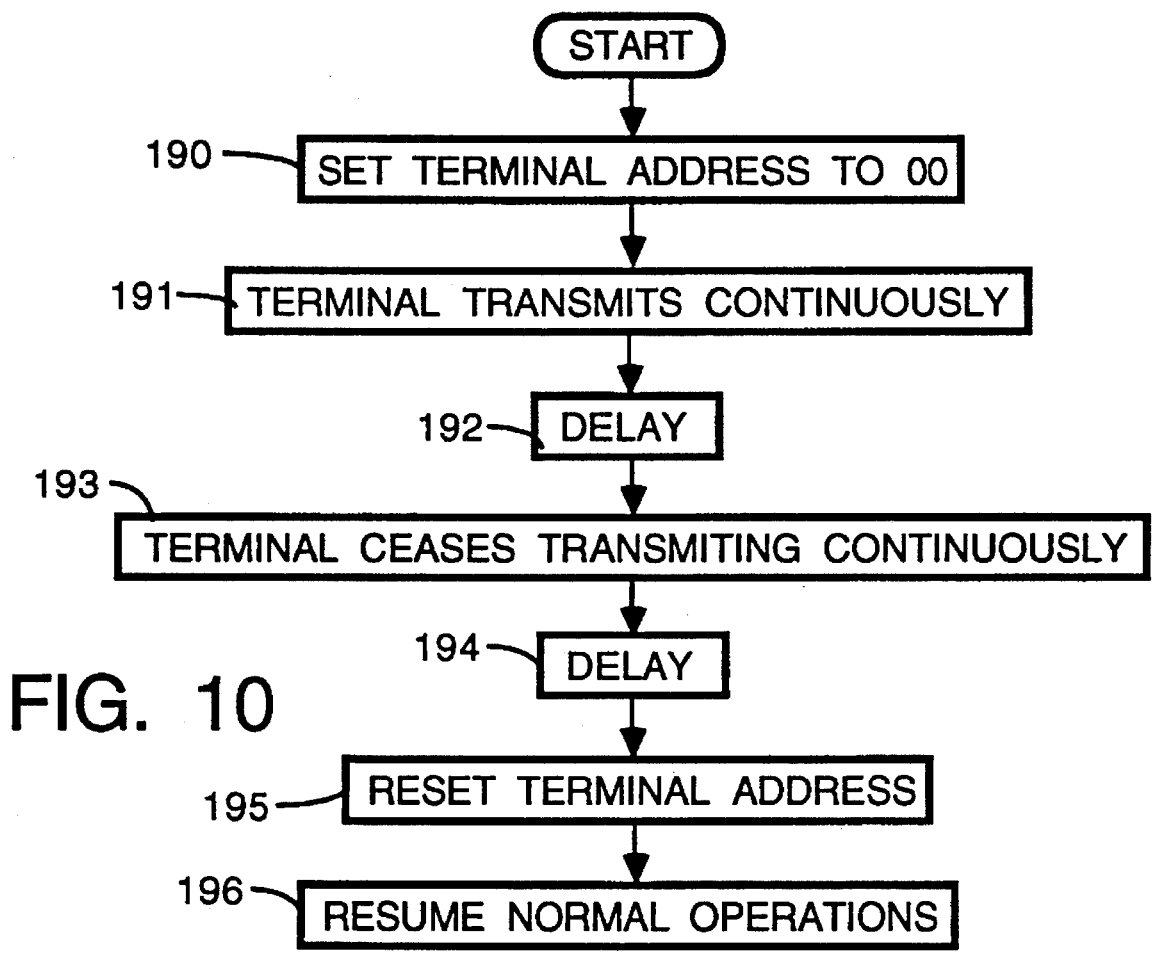
FIG. 10 is a flowchart of a manual override procedure to restore a proper set of communication parameters.

In such cases, the operator can invoke a manual override to force all of the network nodes to adopt a single set of network parameters as specified by the overriding device. To do so as shown in FIG. 10, the operator enters the appropriate commands into the user interface terminal 19 and forces the terminal to utilize the network address 00 at step 190. This address is reserved for the manual override purposes and cannot be assigned to a regular node on the network 10. With network address 00 the user interface terminal 19 and its media access controller becomes the moderator in place of the rogue node. At step 191 the network communication parameters are changed so that the terminal begins transmitting continuously over the network cable 11. This ensures that all the other nodes will hear the terminal's moderator Lpacket containing a set of protocol parameters entered into the terminal 19 by the operator. Any node that receives a moderator Lpacket with network address 00 in the source address field 24 immediately stores the protocol parameters carried by the moderator Lpacket and begins operation with those parameters. After a delay at step 192, the network communication parameters are changed of terminal 19 are changed to terminate the continuous transmissions at step 193 which allows other nodes to rejoin the network. As each node rejoins the network 10, it enters the non-moderator state as the terminal's node has the lowest network address. After another delay at step 194, the operator terminates the user interface terminal operation with network address 00 at step 195 at which time the node with the next lowest numerical network address becomes the low man and begins operating in the moderator node state 121. The terminal then at step 196 resumes normal operation using the network address that is had prior to assuming address 00.

As previously noted, the user interface terminal 19 may be connected to the terminal lines 93 and 94 of the media access controller 20 at any of the network nodes 12–18. Furthermore, a single user interface terminal may be used on a number of communication networks 10 within the same factory. Thus, it is often impractical to assign a specific network address to the user interface terminal since an address which will be compatible with one network may not be compatible with another network within the same factory. As a consequence, a technique has been developed which enables the user interface terminal to find a vacant network address for the particular network to which it is connected and then utilize that address in communication.

Figure 9:
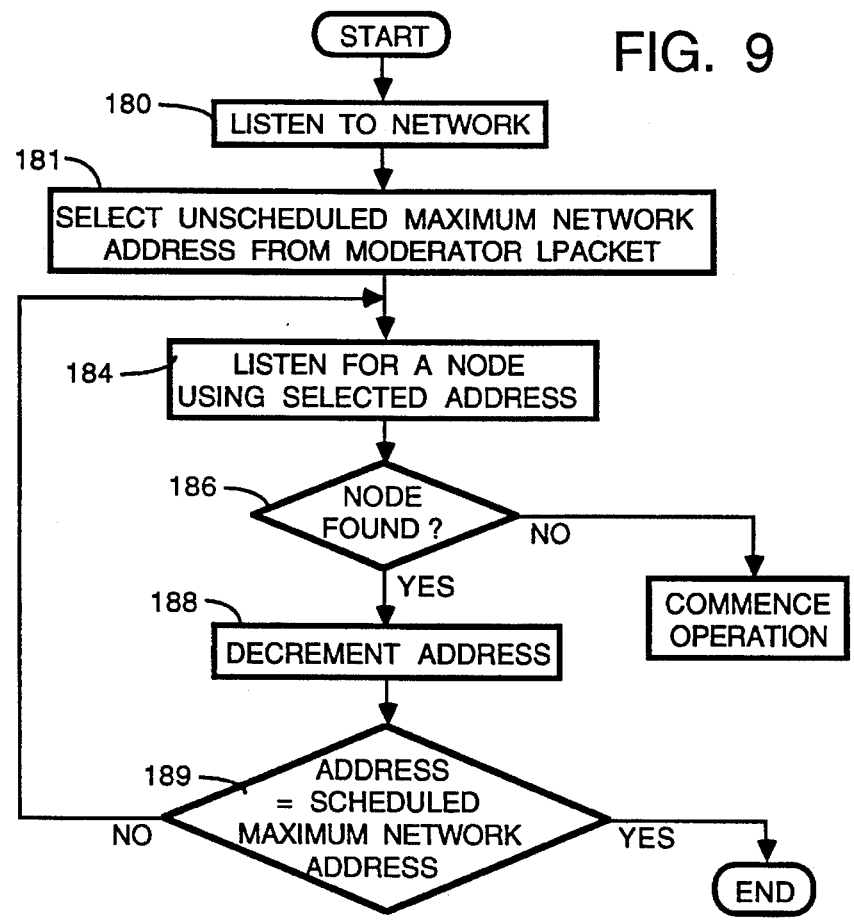
FIG. 9 is a flowchart of the process by which a user interface terminal connected to a node obtains a network address.

This process is depicted by the flowchart in FIG. 9 which commences at step 180 by the user interface terminal 19 listening to the activity on the network cable 11. The modem 90 of the media access controller 20 to which the terminal is connected sends each MAC frame 21 received from the network to the user interface terminal. At step 181, the user interface terminal dissects the moderator Lpacket received from the network and obtains from field 74 the maximum network address which can be utilized during the unscheduled phase 54. The user interface terminal then listens for several periodic intervals for the occurrence of a slot for that maximum network address and whether a MAC frame 21 is sent in that slot at step 184. If such a MAC frame 21 is not sent, the program branches at step 186 to commence normal operation of the user interface terminal which then utilizes the selected network address.

However, if another node is found to be transmitting utilizing the maximum unscheduled phase network address, the user interface terminal decrements that address by one at step 188 and then checks the new address at step 189 to determine if it has been decremented to the maximum address allowed to be used during the scheduled phase. If the user interface terminal 19 reaches the maximum scheduled phase address without finding a vacant address, the process terminates without gaining access to the network. Otherwise, the address assignment routine returns to step 184 to listen for the occurrence of an unscheduled slot which has been assigned to the new address. This process continues until either the user interface terminal 19 finds a vacant network address which it can use to send data, or reaches the maximum scheduled phase address without finding a vacant address. In practice, the network will be configured with several vacant network addresses at the high end so that the user interface terminal 19 will be likely to find an available address.

The invention being claimed is:

1. In a communication network having a plurality of nodes connected to a medium with each node being assigned a unique network address within a range of numerical values, and wherein one of the plurality of nodes is designated as a moderator which periodically transmits a set of communication protocol parameter values over the medium, a method by which a given node determines whether to function as the moderator comprising:

receiving messages sent by other nodes over the medium, each message including an identification of the network address from which the message originated;

determining from received messages whether another node is assigned a network address that is closer to one extreme of the range of numerical values than a network address assigned to the given node; and functioning as the moderator by periodically transmitting communication protocol parameter values, when the given node has a network address that is closer to the one extreme of the range of numerical values than all other nodes which are sending messages over the medium.

2. The method as recited in claim 1 wherein the given node determines whether another node is assigned a network address with a lower numerical value than the network address assigned to the given node in said determining step, and the given node assumes operation as the moderator in said functioning step when the given node has a network address that is lower in numerical value than the network addresses of all other nodes which are sending messages over the medium.

3. The method as recited in claim 1, wherein when the given node is not functioning as the moderator, the method for the given node further comprises the steps of:

receiving the communication protocol parameter values transmitted over the medium by an existing moderator;

comparing the communication protocol parameter values transmitted by said existing moderator to a group of communication protocol parameter values stored in the given node; and wherein the given node is permitted to transmit over the medium only when the communication protocol parameter values received from said existing moderator match the group of communication protocol parameter values stored in the given node.

4. The method as recited in claim 3 further comprising the steps of:

receiving a control message transmitted over the medium by a candidate moderator node, the control message including a new set of communication protocol parameters and a unique parameter value that forces the given node to accept the candidate moderator node as the moderator; and responding to the control message containing the unique parameter value by storing the new set of communication protocol parameter values as the group of communication protocol parameter values for use in communicating over the network.

5. The method as recited in claim 3 further comprising:

another node transmitting communication protocol parameter values over the medium in a control message containing a special network address that is reserved from assignment to a node; and the given node responding to the control message by storing the communication protocol parameter values as the group of communication protocol parameter values for use in communicating over the network.

6. The method as recited in claim 5 wherein the special network address is address zero.

7. The method as recited in claim 1 in which the step of functioning as the moderator further comprises transmitting a new set of communication protocol parameter values over the medium in a control message containing a unique parameter value that forces other nodes to accept the given node as the moderator.

8. In a communication network having a plurality of nodes connected to a medium with each node being assigned a unique numerical network address, and wherein one of the plurality of nodes is designated as a moderator which periodically transmits a set of communication protocol parameter values over the medium, a method performed by a given node comprising steps of:

receiving the set of communication protocol parameter values transmitted over the medium by the moderator;

storing the received set of communication protocol parameter values;

utilizing the stored set of communication protocol parameter values to transmit messages over the medium receiving messages sent by other nodes over the medium, each message including an identification of the network address from which the message originated;

determining from received messages whether another node is assigned a network address with a lower numerical value than the network address assigned to the given node; and the given node functioning as the moderator by periodically transmitting communication protocol parameter values, when no other node that is sending messages over the medium has a lower numerical network address than the given node.

9. In a communication network having a plurality of nodes connected to a medium with each node being assigned a unique numerical network address, and wherein one of the .plurality of nodes is designated as a moderator which periodically transmits a set of communication protocol parameter values over the medium, a method performed by a given node comprising steps of:

receiving the set of communication protocol parameter values transmitted over the medium by the moderator;

storing the received set of communication protocol parameter values;

utilizing the stored set of communication protocol parameter values to transmit messages over the medium utilizing a user interface terminal connected to the network for determining a network address to use by performing steps including:

(a) receiving the set of communication protocol parameter values transmitted over the medium by the moderator;

(b) determining from the set of communication protocol parameter values a maximum address that is allowed to be used on the network;

(c) selecting the maximum address as a terminal address;

(d) listening to activity on the network to detect whether the terminal address, that was selected, is being used by another node; and (e) if the terminal address is being used by another node, decrementing the terminal address and returning to step (d), otherwise using the terminal address to communicate over the network medium.

10. The method as recited in claim 9 in which step (e) is modified such that said user interface terminal ceases returning to step (d) and thereby fails to join the network, if the terminal address is decremented below a predefined value.

11. In a communication network having a plurality of nodes connected to exchange messages over a medium with each node being assigned a unique network address, and each message including an identification of the network address from which the message originated, and wherein a moderator node periodically transmits moderator messages over the medium, a method by which a given node determines whether to function as the moderator node comprising:

(a) receiving a first moderator message containing a first set of protocol parameter values transmitted over the medium by the moderator node;

(b) comparing the first set of protocol parameter values transmitted by the moderator node to a second set of protocol parameter values stored in the given node;

(c) disabling transmission of messages over the medium by the given node when the first and second sets of protocol parameter values are not substantially identical;

(d) while transmission of messages from the given node continues to be disabled, monitoring the medium for transmission of messages by other nodes, and upon detecting that no messages are being sent over the medium for a defined period of time, starting a timer to time a watch interval;

(e) if a second moderator message containing a third set of protocol parameter values is received by the given node during said watch interval, and the third set of protocol parameter values contained in said second moderator message do not match the second set of protocol parameter values stored in the given node, terminating the first timer and returning to step (d);

(f) when the first timer times out, determining from activity on the medium whether another node is assigned a network address with a lower numerical value than the network address assigned to the given node;

(g) functioning as the moderator node by periodically transmitting further moderator messages which contain further protocol parameter values, when no other node that is sending messages over the medium has a lower numerical network address than the given node; and (h) functioning as a non-moderator node when another node is sending messages over the medium that have a lower numerical network address than the given node.

12. The method as recited in claim 11 further comprising upon powering up, the given node transmitting configuration data to other nodes on the network with which the given node is to communicate.

13. The method as recited in claim 11 further comprising upon powering up, the given node receiving the second set of protocol parameter values from another node on the network with which the given node is to communicate; and storing the second set of protocol parameter values into a memory.

14. The method as recited in claim 11 further comprising after disabling transmission of messages over the medium, the given node enables transmission of messages over the medium upon consecutively receiving a predefined number of first sets of protocol parameter values each of which matches the second set of protocol parameter values.

15. In a communication network having a plurality of nodes connected to a medium with each node being assigned a unique numerical network address, each message including an identification of the network address from which the message originated, and wherein one of the plurality of nodes is designated as a moderator node which periodically transmits moderator messages over the medium, a method by which a given node determines whether to function as the moderator node comprising: if the given node is not functioning as the moderator, the given node performs steps of:

(a) receiving a first moderator message containing a first set of protocol parameter values transmitted over the medium by an existing moderator node, (b) comparing the first set of protocol parameter values transmitted by said existing moderator to a second set of protocol parameter values stored in the given node, (c) disabling transmission of messages over the medium by the given node when the first and second sets of protocol parameter values are not substantially identical, (d) while transmission of messages from the given node continues to be disabled, monitoring the medium for transmission of messages by other nodes, and upon detecting that no messages are being sent over the medium for a first period of time, starting a first timer to time a first interval, (e) if a second moderator message containing a third set of protocol parameter values is received by the given node during the first interval, and the third set of protocol parameter values contained in said second moderator message do not match the second set of protocol parameter values stored in the given node, terminating the first timer and returning to step (d), (f) when the first timer times out, determining from activity on the medium whether another node is assigned a network address with a lower numerical value than the network address assigned to the given node, (g) functioning as the moderator node by periodically transmitting further moderator messages which contain further protocol parameter values, when no other node that is sending messages over the medium has a lower numerical network address than the given node, and (h) functioning as a non-moderator node when another node is sending messages over the medium that have a lower numerical network address than the given node; and if the given node is functioning as the moderator node, the given node performs steps of:

(i) upon detecting that only moderator messages are being sent over the medium for a second period of time, disabling transmission of messages over the medium and starting a second timer to time a second interval that is longer than the first interval, (j) if a third moderator message containing a fourth set of protocol parameter values is received by the given node during the second interval and the fourth set of protocol parameter values contained in said third moderator message do not match the second set of protocol parameter values stored in the given node, terminating the second timer and entering step (d) as a non-moderator node, and otherwise (k) when the second timer times out, determining from activity on the medium whether another node is assigned a network address with a lower numerical value than the network address assigned to the given node, (l) functioning again as the moderator node by periodically transmitting further moderator messages which contain further protocol parameter values, if no other node that is sending messages over the medium has a lower numerical network address than the given node, and (m) functioning as a non-moderator node when another node is sending messages over the medium that have a lower numerical network address than the given node.

* * * * *